310-800 SR

1/25/83 XR 4,370,663

United States Patent [19]

Markham

[11] 4,370,663

[45] Jan. 25, 1983

[54] THIN BODY INK DROP GENERATOR

[75] Inventor: Roger G. Markham, Webster, N.Y.

[73] Assignee: Xerox Corporation, Stamford, Conn.

[21] Appl. No.: 212,646

[22] Filed: Dec. 3, 1980

[51] Int. Cl.³ .............................................. G01D 15/18

[52] U.S. Cl. .................................. 346/75; 346/140 R; 310/800

[58] Field of Search ............................. 346/75, 140 IJ; 310/800

[56] References Cited

U.S. PATENT DOCUMENTS

| | | | |
|---|---|---|---|
| 4,005,435 | 1/1977 | Lundquist et al. | 346/1 |
| 4,032,928 | 6/1977 | White et al. | 346/140 R |
| 4,138,687 | 2/1979 | Cha et al. | 346/75 |
| 4,296,417 | 10/1981 | Markham et al. | 346/75 |
| 4,303,927 | 12/1981 | Tsao | 346/75 |

OTHER PUBLICATIONS

U.S. Serial No. 45,045 filed Jun. 4, 1979 by Roger Markham, entitled "Ink Jet Method and Apparatus Using a Thin Film Piezoelectric Excitor for Drop Generation".

*Primary Examiner*—Stafford D. Schreyer

[57] ABSTRACT

A continuous liquid drop generator and a printing system employing it are disclosed. The generator includes a thin cavity which contains liquid under pressure. The liquid is emitted through a nozzle as a liquid column from which drops are formed. The liquid in the cavity is acoustically stimulated by a thin, flexible piezoelectric exciter. Polyvinylidene fluoride ($PVF_2$) is one piezoelectric material disclosed. The thin body generator includes a transmission plate or block between a backing plate and a nozzle plate. The transmission plate chemically protects the exciter and provides space for an infeed conduit that couples a liquid to the thin cavity. The generator design is especially suited for multiple-nozzle drop generators. One printing system disclosed employs a multiple nozzle generator with each nozzle addressing drops to multiple pixels within a segment of a scan line. Collectively, the drop streams emitted from the multiple nozzles are able to compose a full scan line on a target. The target moves relative to the drop generator.

12 Claims, 4 Drawing Figures

THIN BODY INK DROP GENERATOR

BACKGROUND

This invention relates to ink jet or liquid drop recording, printing and the like systems. In particular, this invention relates to method and apparatus for generating continuous streams of liquid drops.

Liquid drop generators of the present type are described by Sweet in U.S. Pat. No. 3,596,275. Drops are generated continuously from a column of liquid emitted under pressure from a chamber via a nozzle. As characterized by Lord Rayleigh, drops continuously separate from the end of the liquid column in a predictable fashion. The uniformity of drop size and spacing are improved by stimulating the liquid at a fixed frequency. In addition, the stimulation stabilizes the location of drop separation from the liquid column. This is important for controlling the process of charging the drops by a charging electrode tunnel located at the drop separation region.

The problems associated with drop generation, such as non-uniformity in drop size and shape or in the non-stability of the drop break-off point, are most troublesome in multi-nozzle or multi-drop stream systems. Simply put, variations in drop parameters from nozzle to nozzle create control problems. The problems are especially difficult in systems where great accuracy in drop placement is required. An example of such a system is a high resolution ink jet printer.

Also, start up and shut down of an ink drop generator is troublesome in single as well as multi-nozzle drop generators. The liquid can cause electrical shorting and other problems if a liquid column and its drop stream are not appropriately handled at start up and shut off.

SUMMARY

Accordingly, a main object of this invention is to design a liquid drop generator that overcomes the limitation of prior art generators.

Another object of this invention is to create a liquid drop generator capable of generating drops over a wide range of drop generation rates or frequencies.

Still another object of this invention is to employ thin, flexible piezoelectric structures as an acoustic exciter in a liquid drop generator.

Yet another object of this invention is to define a drop generator having a low volume liquid cavity or chamber from which liquid drops streams are emitted to improve the start up and shut down ability of a drop generator of the present type.

It is also an object of the invention to devise methods and apparatus for exciting thin liquid cavities in continuous drop generators that have a plurality of nozzles extending over significant distances such as an 8.5 inch document width in an ink jet printer.

Another object is to devise improved method and apparatus for coupling liquid under pressure into a thin liquid chamber while not adversely impacting the acoustic performance of the generator.

These and other objects of this invention are achieved with a novel thin body drop generator. The presently preferred embodiment includes a polyvinylidene fluoride ($PVF_2$) film as the acoustic exciter. The exciter is sandwiched between a backing plate and a transmission block. The thin liquid chamber is formed in a gap between the transmission block and a nozzle plate. The transmission block serves to chemically isolate the $PVF_2$ film and to provide means for coupling a liquid supply to the thin chamber.

The nozzle plate contains the nozzle or nozzles for emitting the liquid drop streams. It may be characterized as a mass coupled to a spring. The spring is the liquid in the thin cavity. The nozzle plate is oscillated by the acoustic waves generated by the $PVF_2$ exciter. The backing plate, transmission plate, liquid chamber and nozzle plate are all thin. That is, their thicknesses are small compared to a half wavelength of the acoustic waves in the plates and liquid at the frequency of the drop generation rate.

Also, the transmission block and nozzle plate includes liquid moats to isolate the generator body from the acoustic excitation. In addition, the backing plate includes air moats to isolate the generator body from the $PVF_2$ exciter oscillations.

A special suspension means is provided the nozzle plate to enable it to act as the mass on the spring and for the backing and transmission plates to confine the acoustic energy to the region of the liquid chamber. The nozzle plate has adequate thickness to withstand the liquid pressure in the thin chamber yet is thin enough to resonant as a mass on a spring at the desired drop generation rate.

PRIOR ART STATEMENT

Heretofore, thin polymer piezoelectric excitors have been not been reported for use in ink jet generators. However, the present inventor has disclosed an application of $PVF_2$ in an ink jet generator in a copending application that is now U.S. Pat. No. 4,296,417, U.S. Ser. No. 045,045 filed June 4, 1979. The disclosure of that patent is hereby incorporated herein by reference. There has been no publication of the disclosure in that patent prior to the filing date of this application.

A wideband ink jet modulator using a thin piezoelectric crystal is disclosed in U.S. Pat. No. 4,032,928 to White and Lovelady. That patent also discloses a multiple nozzle drop generator in the embodiment of FIG. 8. The single nozzle modulator 10 in FIGS. 1, 2, 3, 4 and 5 of White et al and the multi-nozzle modulator 101 in FIG. 8 are truly miniature devices. That is, the thickness of the entire modulator is small compared to the smallest standing acoustic wave that can be established in the part in question. However, the width of the device is also confined to a small dimension (0.375 inch). The multi-nozzle embodiment of FIG. 8 is reported as equal in configuration to the single nozzle device 10 in FIGS. 1–5. In contrast, one inportant embodiment of the present invention is one in which the width of the thin device is so great as to enable it to span an 8.5 inch wide document, for example.

Furthermore, the present invention is directed to coupling polymer piezoelectric films to drop generator devices. The White et al patent simply reports on the use of piezoelectric crystal as the exciter. There is not even a reference to a piezoelectric ceramic as an alternate material.

Still a further distinction of this invention over White et al is the use of a transmission block between a backing plate and a nozzle plate. The transmission block houses the plumbing to couple a liquid to the thin liquid chamber yet does not adversely affect the generation of drops at the desired rate.

U.S. Pat. Nos. 4,005,435 to Lundquist et al and 4,138,687 to Cha et al are examples of prior art thick excitors. That is, these patents are representative of large volume, reasonantly driven drop generators.

THE DRAWINGS

Other objects and features of the invention are apparent from the specification, the claims and the drawing taken together or separately. The drawings are:

DETAILED DESCRIPTION

Figure 1:
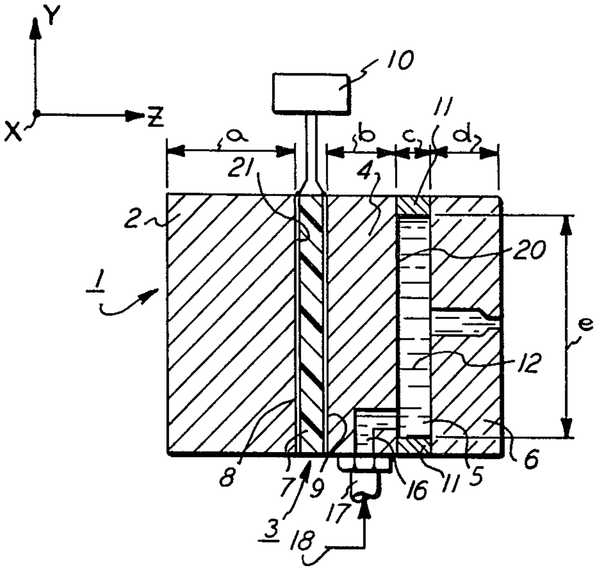
FIG. 1 is a sectional, side view of one embodiment of the liquid drop generator according to the present invention.

The scale of the drawings is greatly exaggerated to help in the description. The thin body generator 1 in FIG. 1 includes a backing plate 2, a thin piezoelectric exciter 3, a transmission block 4, a liquid chamber 5 and a nozzle plate 6. The exciter includes an electrically poled polyvinylidene fluoride ($PVF_2$) film 7 having electrodes 8 and 9 on opposite sides of the film. The electrodes or leads 8 and 9 are electrically coupled to an AC voltage source 10 to electrically activate the film. The activated film generates acoustic oscillations at the frequency of the AC source. One example of an AC signal frequency is 100 thousand hertz (kHz). The oscillation frequency of the exciter 3 determines the drop generation rate, in this example 100 thousand drops per second. Spacers 11 between the transmission block and nozzle plate along with plates 4 and 6 define the cavity or chamber 5.

Drops are produced from liquid fed into the chamber 5 under pressure. The liquid pressure forces a column 13 (see FIG. 4) of liquid out of the generator 1 through a nozzle 14. The column breaks up into drops 15 (see FIG. 4) at some finite distance from the nozzle. The break up point remains constant as do the size and spacing of the drops due to the fixed frequency, acoustic stimulation of the liquid by exciter 3.

The exciter 3 is preferably an electrically poled, $PVF_2$ film of the type disclosed in my U.S. Pat. No. 4,296,417 supra and the reader is referred to that patent for a more detailed explanation. The term piezoelectric, as used herein, is meant to include not only a piezoelectric response exhibited by a structure but also an electrostrictive response exhibited by a structure. Broadly, the present piezoelectric exciter is intended to define those devices that convert AC electrical energy into AC mechanical or acoustic energy.

The exciter $PVF_2$ film 7, including the electrodes 8 and 9, is about 0.001 inch (1 mil) thick. The lowest acoustic resonant frequency associated with a $PVF_2$ exciter of a mil thickness is well above the 50–250 kHz drop generation frequencies of interest in ink jet printing systems. Consequently, the exciter 3 is operated at a non-resonant frequency which is contrary to prior art experience. Conventional practice is to drive an exciter at its lowest or a multiple resonant frequency because the maximum coupling of the acoustic energy to a liquid is realized at a resonant frequency. An exception to the conventional practice is the usage reported by White et al in U.S. Pat. No. 4,032,928 supra. However, the disclosure of White et al is limited to a specific miniature drop modulator that is not merely thin but also very narrow. The narrowness of the structure reported by White et al makes the device unsuited for generating a plurality of streams spanning all or large portions of the width of a target, e.g. an 8.5 inch or 11 inch dimension of a plain paper target.

The exciter 1 is successful as a wide, multiple nozzle drop generator for reasons that include the use of polymer exciters such as $PVF_2$ films. The prior art teaching, as represented by White et al, suggested that only limited surface area exciters are possible. It is believed that this attitude follows from a desire to have the lowest lateral resonant mode (in the plane of the exciter) lie at frequencies well in excess of the desired operating frequency. In hard, low attenuation materials such as piezoelectric crystals and ceramics, the lateral resonances can have dramatic effects. Furthermore, thin piezoelectric crystals and ceramics are difficult if not impossible to produce and use in large area sheets because of this brittle nature. The miniature modulator of White et al succeeds simply because of its exceptionally small scale in width as well as thickness.

The exciter 1 also differs from the White et al exciter in other ways. One dramatic difference is that exciter 1 employs a transmission block 4. Another dramatic difference is that exciter 1 employs a comparatively thick backing plate 2.

Viewed as an entity generator 1, with exciter 3 sandwiched between two thick plates 2 and 3, appears to be similar to prior art devices such as those disclosed in U.S. Pat. Nos. 4,005,435 to Lindquist et al and 4,138,687 to Cha et al. In these two patents a piezoelectric crystal or ceramic is located between two thick metal blocks. One of the blocks is in contact with the liquid in an ink chamber. In these devices, the dimensions of the metal blocks or plates are comparable to the acoustic wavelengths involved. The thicknesses of the sandwich in the prior art devices are selected to set the shortest acoustic resonant frequency of the three composite layers equal to the desired drop generation rate.

In this invention, the thickness of the backing plate 2 and transmission plate or block 4 are selected such that the acoustic resonant frequency of the composite layers 2, 3 and 4 is still well above the desired drop generation frequency. For this reason, the present drop generators are substantially different from those of the prior art.

Figure 3:
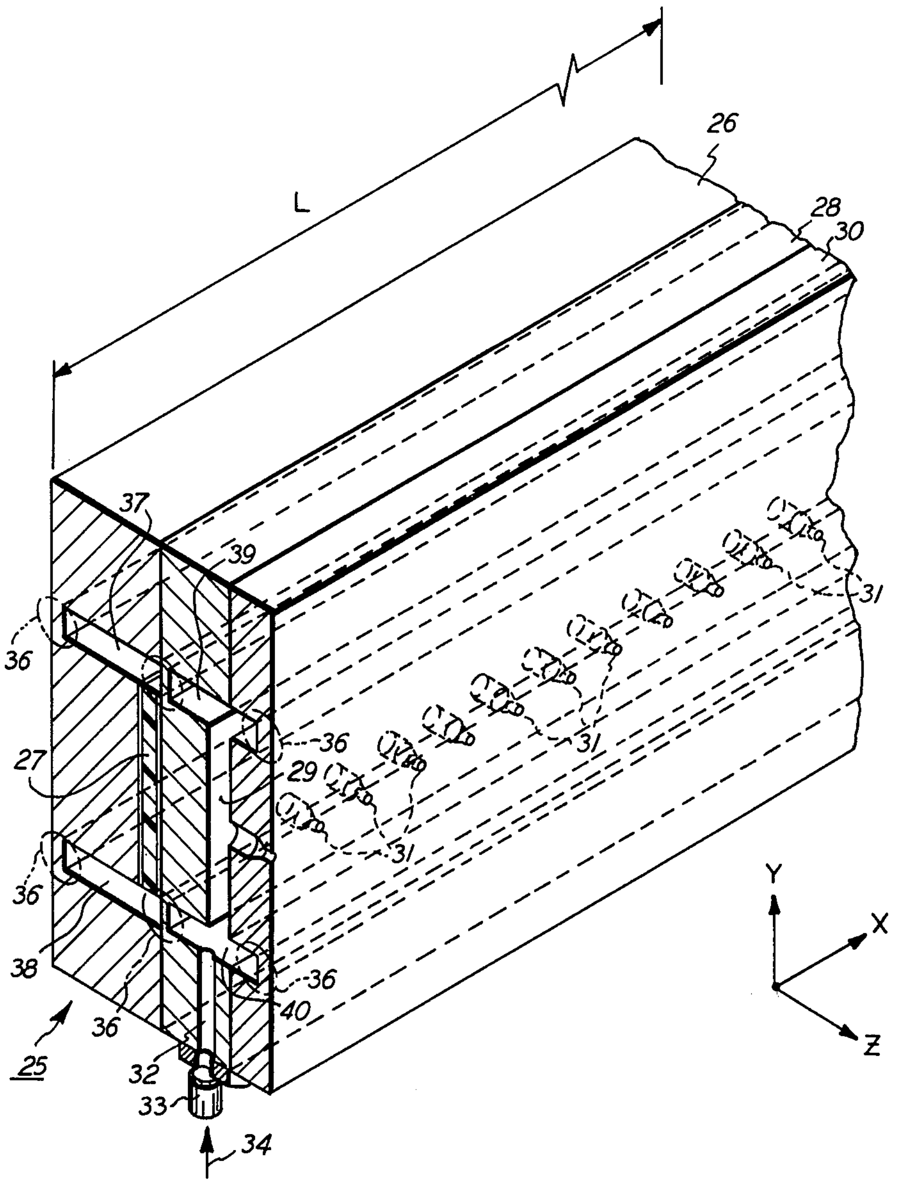
FIG. 3 is an isometric view of the drop generator of FIG. 2 that illustrates the multiple nozzle construction of generators of the present invention.

The thickness "a" (see FIG. 1) of the backing plate 2 is made large compared to that shown in FIG. 3 of the White et al U.S. Pat. No. 4,032,928 wherein the thickness of a backing plate is represented as less than that of the piezoelectric crystal. The thickness "b" of the transmission block 4 is selected here to be equal to or less than that of the backing plate, a thin diaphragm is disclosed in White et al rather than a transmission block.

The transmission block chemically isolates the exciter 3 from the liquid in the chamber 5. It also has adequate thickness for accommodating the fluid or liquid infeed conduit 16. The infeed pipe 16 is coupled to an external conduit 17 which in turn is in fluid communication with a pressurized liquid source represented by the arrow 18.

The chamber thickness "c" (see FIG. 1) is very small. Specifically, it is significantly less than that of the transmission plate or nozzle plate. Its thickness is selected such that there is substantially no difference in the acoustic pressure across the dimension "c". This condition permits the generator to be characterized or analogized to a mass on a spring. The mass is the nozzle plate and the spring is the liquid in chamber 5. The motion or displacement of wall 20 of the transmission block due to the oscillation of exciter 3 is imparted to the nozzle plate 5 by the liquid. The result is that the static pressure of the liquid in chamber 5 is varied by some amount at the frequency established by the AC voltage source 10. These pressure variations in turn cause drops 15 (FIG. 4) to be generated at the frequency of source 10.

Past generators, while successful, have shown some non-uniformity from drop stream to drop stream in multiple nozzle generators. The cause of this is due, at least in part, to the interaction of the acoustic waves in the liquid chamber and the acoustic waves in the body of the generator, i.e. the walls, backing plates and the like. The thin body generators of the present invention are designed to confine the acoustic energy to a small volume of liquid, i.e. the liquid 12 in chamber 5, made with very simple parts.

The thickness of chamber 5 forces offensive transverse compressional acoustic wave modes to occur at frequencies far in excess of the drop generation rate. The thickness "c" of chamber 5, according to the present concept, should be less than 5 percent of the wavelength of sound in the liquid at the drop rate.

The thickness "a" of the backing plate 2 is made as large as permissible while remaining thin in terms of percent of wavelength. The ideal is to have the backing plate wall 21 at rest so that the total thickness changes in the exciter 3 are applied to the transmission block 4. Accordingly, the dimension "a" of a backing plate should be about 5 percent of $L_B$, the acoustic wavelength at the drop rate in the backing plate material. The backing plate 21, transmission block 4 and nozzle plate 6 are composed of stainless steel, the presently preferred material.

As mentioned earlier, the transmission block thickness "b" should be equal to or less than that of "a" when both are made of the same material. Otherwise, the dimension "b" should also be equal to or less than about 5 percent of $L_T$, the acoustic wavelength in the block 4 at the desired drop rate or range of drop rates. This condition is readily met because of the thinness of the plates.

The dimension "d" for nozzle plate 6 is selected to be compatible with the foregoing. The thickness "d" should be large enough to enable the nozzle plate to contain the liquid in chamber 5. It should also be thin to reduce acoustic pressure drop within the nozzle 14 formed in plate 6.

Figure 2:
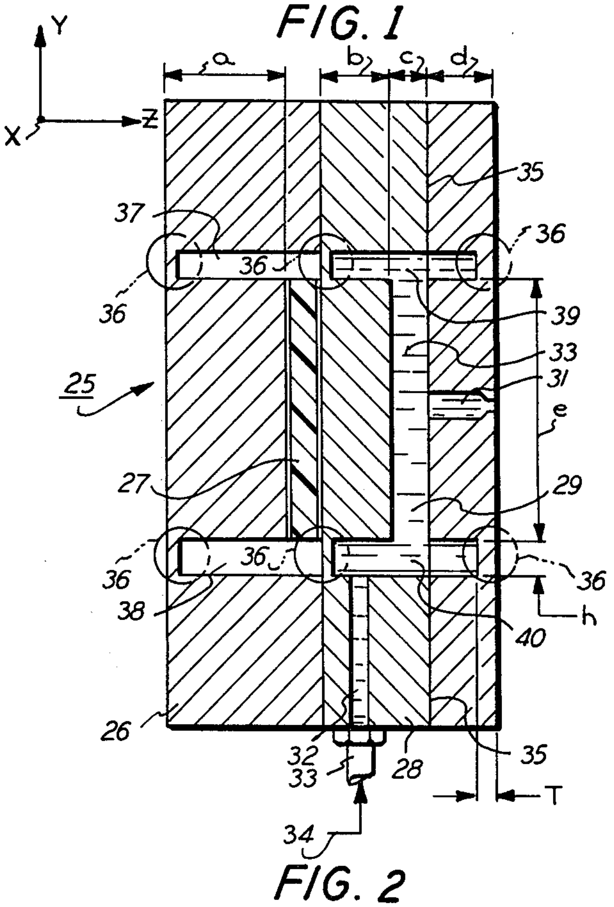
FIG. 2 is a sectional, side view of another embodiment of a drop generator according to the present invention employing air moats in the backing plate, liquid moats in the transmission block and nozzle plate and six thin suspension regions or means for the backing plate, transmission block and nozzle plate.

The nozzle plate 6 may be viewed as a mass vibrating on a spring, i.e. the liquid in chamber 5. If this mass and spring system is operated at its resonant frequency, significant pressure variations are developed in the liquid. The resonant frequency is of course, selected to be near that of the range of desired drop rates. The resonant frequency f is defined by $$f = \frac{1}{2\pi}\sqrt{\frac{P_f C_f^2}{P_n c d}}\ . \qquad \text{equation (1)}$$

where $P_f$ and $P_n$ are the densities of the liquid and nozzle plate, $C_f$ is the speed of an acoustic wave in the liquid, and "c" and "d" are the thicknesses of the chamber 5 and plate 6 shown in FIGS. 1 and 2.

From equation (1), keeping dimension "d" small is intuitively advantageous to the above objectives. However, "d" must be large enough to enable the nozzle plate to withstand the liquid pressure developed in chamber 5. To achieve good mechanical stiffness for the nozzle plate while making the thickness "d" as small as possible, the dimensions "c" and "d" are selected to set the flexural resonance frequency of the nozzle plate near twice the drop rate. The expression for flexural resonance is $$f_{flex} = \frac{C_n d}{e^2} \geqq 2f \qquad \text{equation (2)}$$

where f is the drop rate, $C_n$ is the speed of an acoustic wave in the nozzle plate and "d" and "e" are the dimensions under discussion and shown in FIGS. 1 and 2. Knowing "e", the "d" dimension is selected.

The dimension "e" is selected by setting the value of "e" to one half the acoustic wavelength in the liquid at the drop rate. This is defined by the expression $$e = \frac{L_f}{2} = \frac{C_f}{2f} \qquad \text{equation (3)}$$

where $L_f$ is the acoustic wavelength in the liquid, $C_f$ the acoustic speed in the liquid and f the drop rate.

From equations (2) and (3) setting $f_{flex}=2f$, d is given by $$\text{as } d = \frac{2fe^2}{C_n} = \frac{C_f^2}{2C_n f}\ . \qquad \text{equation (4)}$$

From equations (1) and (4), "c" is given by $$\text{as } C = \frac{P_f C_f^2}{4\pi^2 f^2 d P_n} = \frac{2P_f C_n}{4\pi^2 P_n f}\ . \qquad \text{equation (5)}$$

At the outset, the dimensions "a" and "b" for the backing and transmission plates were said to be about 5 percent of the acoustic wavelength. This is expressed for "a" in $$\text{as "}a\text{"} = \frac{0.05\ C_n}{f} \qquad \text{equation (6)}$$

and for "b" by $$\text{as "}b\text{"} = \frac{0.05\ C_n}{f} \qquad \text{equation (7)}$$

Collectively, the equations (3), (4), (5), (6) and (7) define the dimensions "a", "b", "c", "d" and "e". These definitions show that these dimensions may be scaled proportionally with the drop generation rate f.

The foregoing discussion describes in terms of drop frequency or rate the thin drop generator of this invention. The generator 25 of FIG. 2 has its dimensions a-e selected in the same manner. Generator 25 is the presently preferred embodiment of the present invention, however, because it includes moats for isolating the acoustic energy in the region of a liquid chamber. Generator 25 also includes novel suspension means for the backing plate, transmission block and nozzle plate which act to insulate the supporting structure from the acoustic vibrations.

Generator 25 includes: backing plate 26; piezoelectric exciter 27; transmission plate 28; liquid chamber 29; and nozzle plate 30. The nozzle plate contains a plurality of nozzles 31 that extend for a significant distance 1. (See the isometric view in FIG. 3.) The infeed conduit 32 is coupled to the external conduit 33 that couples a liquid 33 into chamber 29 from a pressurized source represented by arrow 34.

The active acoustic parts of generator 25 are those within the elevation "e" as shown. The regions above and below the dimension "e" constitute the support structure for the generator. The active parts are held in place by thin regions or suspension means of the backing, transmission and nozzle plates identified by the dashed circles 36 at six places in FIGS. 2 and 3. As best seen in FIG. 3, the suspension means or regions extend the length 1 of generator 25. Each suspension region has a uniform cross-section with dimensions h and T as shown in FIG. 2. The h and T dimensions are the smallest possible for the most critical element; namely, the nozzle plate 30. The like dimensions for the suspension regions on the backing plate 26 and transmission plate 28 are by necessity adequate. The suspension regions also define the moats. The generator 25 includes upper and lower air moats 37 and 38 and upper and lower liquid moats 39 and 40.

The moats 37–40 extend across the width of the generator. The x, y and z orthogonal vectors of an x, y and z orthogonal coordinate system are shown in all the figures. The z axis is the direction of the drop streams and the axis along which the thicknesses "a", "b", "c" and "T" are measured. The y axis is the axis along which the heights "e" and "h" are measured. The x axis is the axis along which the plurality of nozzles 31 are arranged over a length l.

The air moats 37 and 38 are formed in the backing plate 26. Their purpose is to confine the acoustic energy to the region of the backing plate within the elevation "e". Also, the air moats define the cross-sectional shape of the suspension means 36 for the backing plate. The y and z axis dimensions of all the suspension means are the same; namely, h×T which are shown in FIG. 2 and explained below. The suspension means 36 for the backing plate can be located at other positions within the air moats along the z axis. In that case, each moat 37 and 38 would be divided into two separate air chambers.

The air moats are cut-outs from the backing plate. They contain an ambient gas such as air. Other gases or materials that have a low acoustic impedance can be used in these moats in lieu of air.

The liquid moats 39 and 40 are formed by cut-outs in the transmission and nozzle plates 28 and 30 above and below the liquid chamber 29. The chamber 29 is itself formed from a cut-out in the transmission block 28. The location of the boundary 35 between plates 28 and 30 in the regions above and below moats 39 and 40 can be varied to suit a specific design requirement. The height of the liquid chamber is treated as the dimension "e" even though it is continuous with the upper and lower moats over its gap or thickness "c".

The height "h" of the liquid moats are small enough for the liquid to be acoustically non-resonant at the drop frequency. The length of the moats along the z axis is given by the sum of the dimensions "b", "c" and "d" less two times the thickness "T" of the suspension regions 36. The liquid moats acoustically isolate the regions of the transmission and nozzle plates above and below the moats from the acoustic energy generated by the exciter 27. (The exciter is, of course, a $PVF_2$ film having electrodes on its sides like the exciter 3 in FIG. 1.) The liquid moats also define the suspension regions 36 of the transmission and nozzle plates 28 and 30.

The suspension regions 36 (all six) are to allow the portion of plates 26, 28 and 30 within the elevation "e" to move freely (comparatively speaking) left to right along the z axis in response to acoustic pressures created by the exciter 27. The suspension regions 36 must be strong enough, however, to retain the pressurized liquid in the chamber 29. If the suspension regions 36 are too soft, start up and shut down of the drop streams is adversely affected. The fundamental criterion is that the retaining force on the suspension regions 36 be less than the inertial forces on the suspension regions 36. This is achieved by choosing the resonant frequency for the suspension regions 36 to be below the drop generation frequency or rate by a factor of two. All six suspension regions 36 are made the same size which suggests that the dimension chosen are those dictated by the plate with the smallest mass: the nozzle plate.

When nozzle plate 30 is executing harmonic motion with displacement amplitude A, the inertial force per unit area along the nozzle area in the x axis is given by $$F_i = P_n w^2 deA \qquad \text{equation (8)}$$

where $P_n$ is the density of the nozzle plate, w is $2\pi f_n$, $f_n$ is the displacement frequency of the nozzle plate, and d and e are the dimensions "d" and "e" shown in FIGS. 1 and 2.

For a suspension region height "h" and thickness "T", the combined force per unit length along the x axis of the suspension regions 36 of the nozzle plate is given by $$\text{as } F_c = \frac{M_n 2AT}{h} \qquad \text{equation (9)}$$

where $M_n$ is the shear modulus of the nozzle plate in the suspension region 36.

When the suspension regions 36 of the nozzle plate is at a resonant frequency, the forces $F_i$ and $F_c$ are equal. This condition enables the following expression for $f_n$ to be stated by $$\text{as } f_n = \frac{W_n}{2\pi} = \frac{1}{2\pi} \sqrt{\frac{2TM_n}{P_n hde}} \qquad \text{equation (10)}$$

Earlier, it was stated that two times the suspension region frequency $f_n$ should be equal to or less than the drop rate of f. Consequently, the ratio of thickness "T" to height "h" for the nozzle plate suspension regions is given by $$\text{as } \frac{T}{h} \leqq \frac{\pi^2 f^2 P_n de}{2M_n} \qquad \text{equation (11)}$$

From equations (3) and (4) for "d" and "e" equation (11) can be rewritten by $$\text{as } \frac{T}{h} \leq \frac{\pi^2 P_n C_f^3}{8 C_n M_n} \quad \text{equation (12)}$$

and by $$\text{as } \frac{T}{h} \leq \frac{\pi^2 P_n C_f^3}{8 C_n C_{shear}^2} \quad \text{equation (13)}$$

$C_{shear}$ is the velocity of a shear wave in the nozzle plate given by $$\text{as } C_{shear} = \sqrt{\frac{M_n}{P_n}} . \quad \text{equation (14)}$$

The ratio of T to h is independent of frequency. To obtain a desired stiffness for the suspension regions one merely chooses an appropriate ratio for T:h. Specific values for T and h are chosen by making the assumption that the mass of the suspension regions 36 of the nozzle plate are negligible compared to that of the portion of the nozzle plate within the acoustic region defined by elevation "e". This assumption is valid if the cross-sectional area of the suspension regions 36, i.e. h×T, is much smaller than the cross-sectional area of portion of the nozzle plate within the height "e", i.e. d×e.

A dimension for "h" is selected empirically for drop generators suited for printing operations. A presently preferred range for h is from about 0.5 to about 1.0 millimeters.

Using the above equations and assumptions, a family of drop generator 25 dimensions are available. The family of generators are scaled in size according to drop generation frequencies f. An example of a family of generators 25 is given by the following Table 1. The material making up the nozzle plate is stainless steel and the liquid is water in the table.

TABLE I

| f(kHz) | a | b | c | d | e | h | T | hT/de |
|---|---|---|---|---|---|---|---|---|
| 100 | 114 | 114 | 15 | 76 | 295 | 40 | 17 | .03 |
| 200 | 57 | 57 | 7.5 | 38 | 147 | 40 | 17 | .12 |
| 500 | 23 | 23 | 3 | 15 | 59 | 10 | 4 | .05 |
| 1000 | 11 | 11 | 1.5 | 7.6 | 29 | 10 | 4 | .18 |

The values of "a" through "T" are in mils. The various parameters to work the equations are: $P_n=7.8$ g/cm$^3$; $C_n=5.8\times10^5$ cm/sec; $C_{shear}=3.1\times10^5$ cm/sec; $P_f=1$; and $C_f=1.5\times10^5$ cm/sec.

Figure 4:
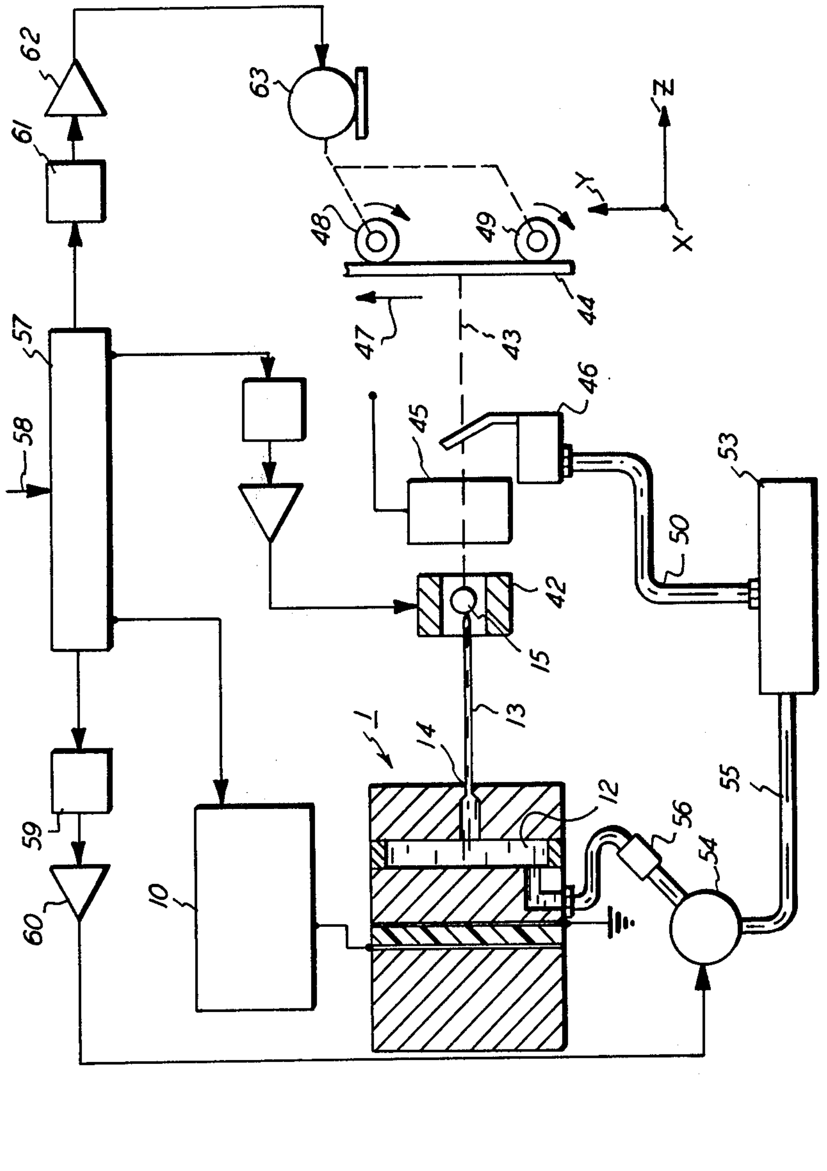
FIG. 4 is a schematic view of a liquid drop printing or recording system using a drop generator according to the present invention.

The drop generators of this invention are suited for ink jet printing systems of the type in FIG. 4 shown by way of example. The generator 1 of FIG. 1 is employed in the system of FIG. 4. Liquid columns 13 exit from a plurality of nozzles aligned along the x axis like the nozzles 31 shown in FIG. 3. At the point of drop formation, a charging electrode tunnel 42 is positioned. The liquid 12 is electrically grounded through the steel body of generator 1. A voltage coupled to a charging electrode, at and just prior to the moment of drop separation from column 13, causes a drop to assume a net charge proportional to the applied voltage.

The drops follow a trajectory 43 toward a target 44 to be printed. Uncharged drops, for example, fly directly to the target or a test gutter (not shown) located downstream of the target. The test gutter is used during such times such as start up and shut down of the drop generator 1. Charged drops are deflected in the x-z plane by a steady state electrostatic field created between two deflection electrodes located on both sides of each drop stream. Only one deflection electrode 45 is shown in FIG. 4 because the other lies directly behind it. The nozzles 14 are spaced apart by many drop diameters. The electrostatic deflection of drops in the x-z plane enables each nozzle to generate drops that address the plurality of pixels within a segment of a scan line at the target 45. A unique charge is assigned to each pixel within the scan line segment. Collectively, the multiple nozzles compose a full scan line or print line from the line segments addressed by each nozzle. If a drop is needed at a given pixel, the drop is charged to the level corresponding to the pixel address. If a drop is not needed or desired at the target, the drop is charged to a level that enables the drop to intersect the collection gutter 46.

Two dimensional images are printed on target 44 in a scan line by scan line raster scanning process. The target is moved in the direction of arrow 47 to present a fresh print line on the target at the x-z plane in which the drops fly. The drive wheels 48 and 49 represent a transport means for moving the target 44 relative to the drop generator 1.

The liquid from the drops collected by the gutter 46 is returned via the conduit 50 to the liquid ink reservoir 53. Liquid is supplied under pressure to generator 1 by the pump 54 that is coupled to conduit 55 running from the reservoir to the generator 1. The device 56 is a filter.

The printing system of FIG. 4 is operated by a controller 57. The controller includes a microprocessor, associated memory and appropriate interface circuits. The controller receives video data at an input line 58. The controller orchestrates the operation of the various components of the system to place drops on the target at desired pixels within a two dimensional raster pattern. The controller regulates the pump 54 via the digital to analog converter (DAC) 59 and the amplifier 60. It controls the AC voltage source 10 that drives the exciter 3. The controller operates the target transport wheels via the DAC 61 and amplifier 62 coupled to the motor 63. The motor is coupled to the wheels 48 and 49 to move the target synchronously with the creation of adjacent scan lines or print lines by drops emitted from the plurality of nozzles 14.

The controller applies voltages to each charging electrode 42 for each drop stream via the DAC's 64 and amplifiers 65. The controller includes a system clock for synchronizing the operation of the many components of the system. In addition, the controller operates the system during the start up, shut down and test procedures.

Many modifications and variations are apparent from the foregoing described method and apparatus. All such modifications and variations are intended to be within the scope of this invention. For example, the generator 1 or 25 can be made without the transmission block with the infeed conduit being located in the backing plate or nozzle plate. Also, the generators of this invention can be employed on carriages that move relative to the target rather than vice versa as shown. A multi-nozzle generator can be used in a binary print system wherein the drops from each nozzle either go to a drop position on the target or to a collection gutter. That is, a nozzle is needed for every pixel within a scan line on a target with each drop in a stream binarily being routed to either the target or the collection gutter. Systems that are a hybrids of the foregoing are also possible.

I claim:

1. A liquid drop generator for generating a plurality of drop streams in flight generally in the z axis direction of an x, y, z orthogonal coordinate system comprising a backing plate member spaced along the z axis from a nozzle plate member defining a liquid chamber capable of containing a liquid under pressure adequate for drop stream generation, said nozzle member including a plurality of nozzles displaced from each other along the x axis for emitting liquid from the chamber under pressure to form liquid columns from which the plurality of drop streams are formed, a thin piezoelectric exciter means including a polymer material adjacent the backing plate for stimulating liquid in the chamber with acoustic energy at a frequency of a desired drop generation frequency, said exciter means having a surface area substantially the same as the x and y axes dimensions of the chamber, and a transmission block member between the exciter means and nozzle plate member with the liquid chamber between the transmission block and nozzle plate members, said transmission block member including infeed conduit means in liquid communication with the liquid chamber for coupling a pressurized liquid source thereto for the generation of the liquid columns and drop streams, with the x axis dimension of the chamber 1, being multiples of the wavelength $L_f$ of acoustic energy traveling in a liquid in the chamber while stimulated at a desired drop generation rate, the y axis dimension of the chamber, e, being about $L_f/2$ and the z axis dimension of the chamber, c, at least opposite the nozzles being less than about 0.05 $L_f$.

2. The generator of claim 1 further including top and bottom moat chambers in liquid communication with the liquid chamber formed in either or both the transmission block and nozzle plate members at two y axis locations of the liquid chamber and extending about the entire x dimension of the liquid chamber.

3. The generator of claim 2 wherein said moat chambers are formed in both the transmission block and nozzle plate members defining suspension regions for the nozzle plate and transmission block members having a z axis dimension, T, and a y axis dimension h and wherein the product $h \times T$ is selected to be many times less than the product of $d \times e$.

4. The generator of claim 1 wherein the backing plate member has a z axis dimension of about 0.05 $L_B$, where $L_B$ is the wavelength of acoustic energy in the backing plate member at the desired drop generation frequency and wherein the z axis dimension of the transmission plate member is about equal to or less than the z axis dimension of the backing plate member.

5. A liquid drop generator comprising a wide thin flexible piezoelectric exciter, backing, transmission and nozzle plates arranged to support said piezoelectric exciter between the backing and transmission plates and to define a wide, thin liquid chamber between the transmission and nozzle plates, said exciter and chamber bounded by a top and bottom moat chamber formed by said backing, transmission and nozzle plates to confine acoustic energy generated by the exciter to certain regions of the backing, transmission and nozzle plates, a plurality of nozzles formed in the nozzle plate and arranged along the thin lateral dimension of the chamber for emitting liquid columns under pressure from which drop streams are formed in flight toward a target, the width of the chamber and arrangement of the nozzles being a distance that is a significant portion of the width or length of a target.

6. The generator of claim 5 further including infeed conduit means located within the transmission plate for coupling a liquid under pressure to the liquid chamber.

7. The generator of claim 5 wherein the exciter includes polyvinylidene fluoride material.

8. A generator of claim 5 further including drop charging electrode means located adjacent each drop stream at the region of drop formation for electrostatically charging drops and drop deflection means adjacent each drop stream between the charging means and a target for electrostatically deflecting charged drops to multiple positions within a segment of a scan line on the target.

9. A generator of claim 8 further including collection gutter means located between the drop deflection means and a target for collecting drops not intended for intersecting a target.

10. The generator of claim 5 further including drop charging electrode means located adjacent each drop stream at the region of drop formation for electrostatically charging drops and drop deflection means between the charging means and a target for electrostatically deflecting charged drops with each drop within each stream following a trajectory that either intersects a target or a collection means located between the deflection means and the target.

11. A liquid drop generating method comprising supplying a liquid under pressure to a liquid chamber which extends between a nozzle plate and a transmission plate, emitting a plurality of liquid columns through a linear array of nozzles formed in the nozzle plate from which liquid drop streams are formed and acoustically stimulating a liquid in the chamber with acoustic waves having a frequency of a desired drop generation rate by steps including coupling an AC voltage to a thin, flexible piezoelectric exciter located between the transmission plate and a backing plate on a side of the transmission plate opposite the nozzle plate, said stimulating frequency causing said acoustic waves to have a wave length at least twenty times greater than the distance between the nozzle plate and the transmission plate.

12. The method of claim 11 further including confining the acoustic waves to the region of the chamber with thin suspension regions coupled at least to the transmission and nozzle plates at locations above and below the liquid chamber.

* * * * *